US007089638B2

(12) United States Patent
Yi et al.

(10) Patent No.: US 7,089,638 B2
(45) Date of Patent: Aug. 15, 2006

(54) METHOD FOR FABRICATING A MICROMACHINED PIEZOELECTRIC MICROSPEAKER

(76) Inventors: Seung-Hwan Yi, 410-304 Jugong Apt., Neutimaeul Jeongja2-dong, Bundang-gu, Gyeonggi-do (KR); Eun-Sok Kim, 26944 Grayslake Rd., Rancho Palos Verdes, CA (US) 90275

( * ) Notice: Subject to any disclaimer, the term of this patent is extended or adjusted under 35 U.S.C. 154(b) by 226 days.

(21) Appl. No.: 10/901,472

(22) Filed: Jul. 27, 2004

(65) Prior Publication Data

US 2005/0005429 A1 Jan. 13, 2005

Related U.S. Application Data

(62) Division of application No. 10/243,958, filed on Sep. 12, 2002, now Pat. No. 7,003,125.

(60) Provisional application No. 60/322,331, filed on Sep. 12, 2001.

(51) Int. Cl.
*H04R 17/00* (2006.01)
*B23P 15/00* (2006.01)

(52) U.S. Cl. ......................... 29/25.35; 29/594; 29/842; 29/846; 216/39

(58) Field of Classification Search .................. 29/594, 29/830, 609.1, 842, 846, 25.35; 216/100, 216/95, 39; 381/190, 173, 155, 191; 367/157, 367/180, 181; 310/311, 322; 257/254, 415, 257/416, 418, 419
See application file for complete search history.

(56) References Cited

U.S. PATENT DOCUMENTS

| | | | | |
|---|---|---|---|---|
| 4,784,721 | A * | 11/1988 | Holmen et al. | 216/2 |
| 5,248,912 | A * | 9/1993 | Zdeblick et al. | 310/332 |
| 5,633,552 | A * | 5/1997 | Lee et al. | 310/311 |
| 5,989,445 | A * | 11/1999 | Wise et al. | 216/62 |

* cited by examiner

*Primary Examiner*—A. Dexter Tugbang
*Assistant Examiner*—Tai Van Nguyen
(74) *Attorney, Agent, or Firm*—Jones Day

(57) ABSTRACT

A micromachined piezoelectric microspeaker and its fabricating method are disclosed. The micromachined piezoelectric microspeaker comprises a diaphragm and a plurality of contact pads. The diaphragm comprises an active area which is flat, and a non-active area which is wrinkled and surrounds the active area. The plurality of contact pads for electrodes are located outside of the diaphragm and over a wafer. And, the method comprises the steps of forming a compressive film on a wafer, forming a bottom electrode on a predetermined part of the compressive film of the front side of the wafer, forming a piezoelectric film on the bottom electrode and on the compressive film of the front side of the wafer, forming a bottom insulator film on the piezoelectric film, forming a top electrode on a predetermined part of the bottom insulator where the top electrode is located over some part of the bottom electrode, forming a top insulator film on the top electrode and on the bottom insulator film, forming contact pads for the bottom electrode and top electrode at an outside part of each electrode, and removing a predetermined part of the wafer which is located between wafer parts located under the each contact pads.

12 Claims, 5 Drawing Sheets

METHOD FOR FABRICATING A MICROMACHINED PIEZOELECTRIC MICROSPEAKER

This application is a divisional of U.S. patent application No. 10/243,958 filed on Sep. 12, 2002, now U.S. Pat. No. 7,003,125 which claims the benefit of U.S. Provisional Application No. 60/322,331, filed on Sep. 12, 2001.

FIELD OF THE INVENTION

This invention relates to the micromachined acoustic transducers and their fabrication technology. More particularly this invention relates to piezoelectric microspeaker with compressive nitride diaphragm.

BACKGROUND OF THE INVENTION

The prior art provides various examples of piezoelectric transducers. Examples of such piezoelectric transducers are disclosed in U.S. Pat. Nos. 6,140,740; 6,064,746; 5,956,292; 5,751,827; 5,633,552; 4,654,554, and 4,979,219. In many cases, the known piezoelectric vibrating plate comprises a single thin metal sheet on one or both sides of which is or are laminated a piezoelectric sheet or sheets consisting of a round thin piece of 20 to 30 mm in diameter. A conventional piezoelectric speaker has a construction in which a vibrating film or sheet is stretched on a frame while being applied tension and a plurality of piezoelectric ceramics are directly stuck on the film. However, ceramic is so fragile that it is very difficult to make thin sheet and also it is not economical in terms of mass production with on-chip circuitry for signal conditioning.

Recently, there has been increasing interest in micromachined acoustic transducers based on the following advantages: size miniaturization with extremely small weight, potentially low cost due to the batch processing, possibility of integrating transducers and circuits on a single chip, lack of transducer "ringing" due to small diaphragm mass. Especially, these advantages make the micromachined acoustic transducers, such as microspeaker and microphone attractive in the applications for personal communication systems, multimedia systems, hearing aid and so on.

Micromachined acoustic transducers are provided with a thin diaphragm by deposition system and several diaphragm materials that must be compatible with high temperature semiconductor process, such as low stress silicon nitride and silicon have been applied as diaphragm. However, micromachined acoustic transducers made by these conventional diaphragm materials suffer from a relatively low output pressure and sensitivity, which are mainly because of the high stiffness and low deflection of these diaphragm materials in case of transducers application. So, in some cases, a conventional piezoelectric speaker used fiber reinforced epoxy, polyester, or ABS resin diaphragm in order to increase the deflection of diaphragm reported in U.S. Pat. No. 5,751,827.

In order to implement the micromachined microspeaker transducers with competitive performance with conventional microspeaker, it is necessary to find the new diaphragm materials that have large deflection with small driving voltage and compatibility with semiconductor process at the same time. Also, proper material and technique should be investigated to cause large deflection of diaphragm.

For the foregoing reasons, there is a need for a micromachined piezoelectric microspeaker which has a new diaphragm materials that have large deflection with small driving voltage and compatibility with semiconductor process at the same time.

SUMMARY OF THE INVENTION

The present invention is directed to a micromachined piezoelectric microspeaker and its fabricating method that satisfies this need. The micromachined piezoelectric microspeaker comprises a diaphragm and a plurality of contact pads. The diaphragm (102) comprises an active area (104), which is flat, and a non-active area (106), which is wrinkled and surrounds the active area (104). The plurality of contact pads (108) for electrodes are located outside of the diaphragm (102) and over a wafer (110).

And, the method comprises the steps of forming a compressive film (202,204) on a wafer (110), forming a bottom electrode (206) on a predetermined part of the compressive film (202) of the front side of the wafer (110), forming a piezoelectric film (208) on the bottom electrode (206) and on the compressive film (202) of the front side of the wafer, forming a bottom insulator film (210) on the piezoelectric film (208), forming a top electrode (212) on a predetermined part of the bottom insulator (210) where the top electrode (212) is located over some part of the bottom electrode (206), forming a top insulator film (214) on the top electrode (212) and on the bottom insulator film (210), forming contact pads (108) for the bottom electrode (206) and top electrode (208) at an outside part of each electrode (206, 208), and removing a predetermined part of the wafer (110) which is located between wafer parts located under the each contact pads (108).

As a novel idea, micromachined piezoelectric microspeaker has successfully been fabricated on a 1.0 μm thick compressive nitride diaphragm (5,000 μm2 for flat square diaphragm, grand cross type, circle shape type with 3 mm diameter, which are shown in FIG. 1A) with electrodes and a piezoelectric ZnO film. The piezoelectric microspeakers are tested with various applying voltage and frequency ranges. The experimental results showed that it has a comparable sound output as a commercial, rather bulky, piezoceramic speaker. The sound output of the microspeaker (fabricated with a relatively simple and robust process) is even higher than a cantilever-based piezoelectric microspeaker patented on May 27, 1997 (U.S. Pat. No. 5,633,552).

The key to this breakthrough is the usage of a diaphragm that has a very high compressive residual stress, high enough to cause the diaphragm to be wrinkled. And we maintain flatness in the speaker active area through a mild tensile stress in the electrode layers, though the non-active area is wrinkled. This way, we can produce a large diaphragm deflection (without being hindered by the diaphragm stretching effect) with good control over a flat, active area where the electromechanical transduction is happening.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Microelectromechanical Systems (MEMS) technology has been used to fabricate tiny microphones and microspeaker [1,2,3] on silicon wafer. This method of fabricating acoustic transducers on silicon wafer has the following advantages over the more traditional methods: potentially low cost due to the batch processing, possibility of integrating sensor and amplifier on a single chip, and size miniaturization.

Compared to more popular condenser-type MEMS transducers, piezoelectric MEMS transducers are simpler to fabricate, free from the polarization-voltage requirement, and responsive over a wider dynamic range [4,5,6]. However, piezoelectric MEMS transducer suffers from a relatively low sensitivity, mainly due to high stiffness of the diaphragm materials used for the transducer. The thin film materials for diaphragm strictly restricted to use such as silicon nitride, silicon, and polysilicon though these materials have high stiffness and residual stress. It is because of the considerations of compatibility with high temperature semiconductor process. High temperature semiconductor process hinders the usage of more flexible materials such as polymer films and metal foils as diaphragm materials though many conventional bulky acoustic transducers use polymer diaphragm to improve the performance.

Figure 1A:
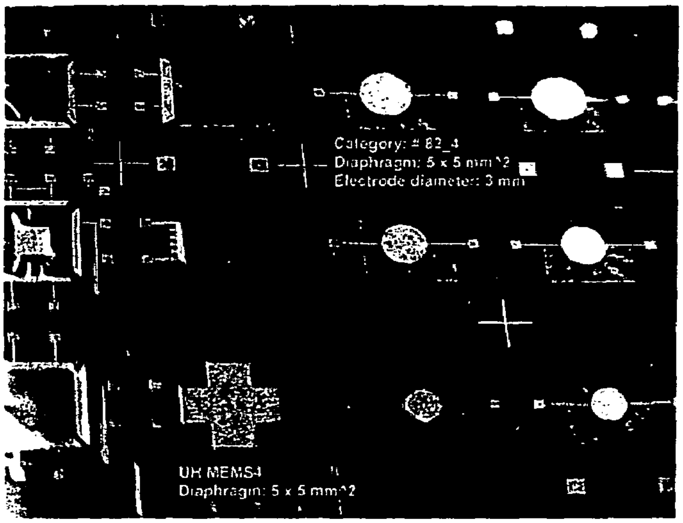
FIG. 1A shows piezoelectric microspeaker built on a wrinkled diaphragm (photo of fabricated speakers)
Figure 1B:
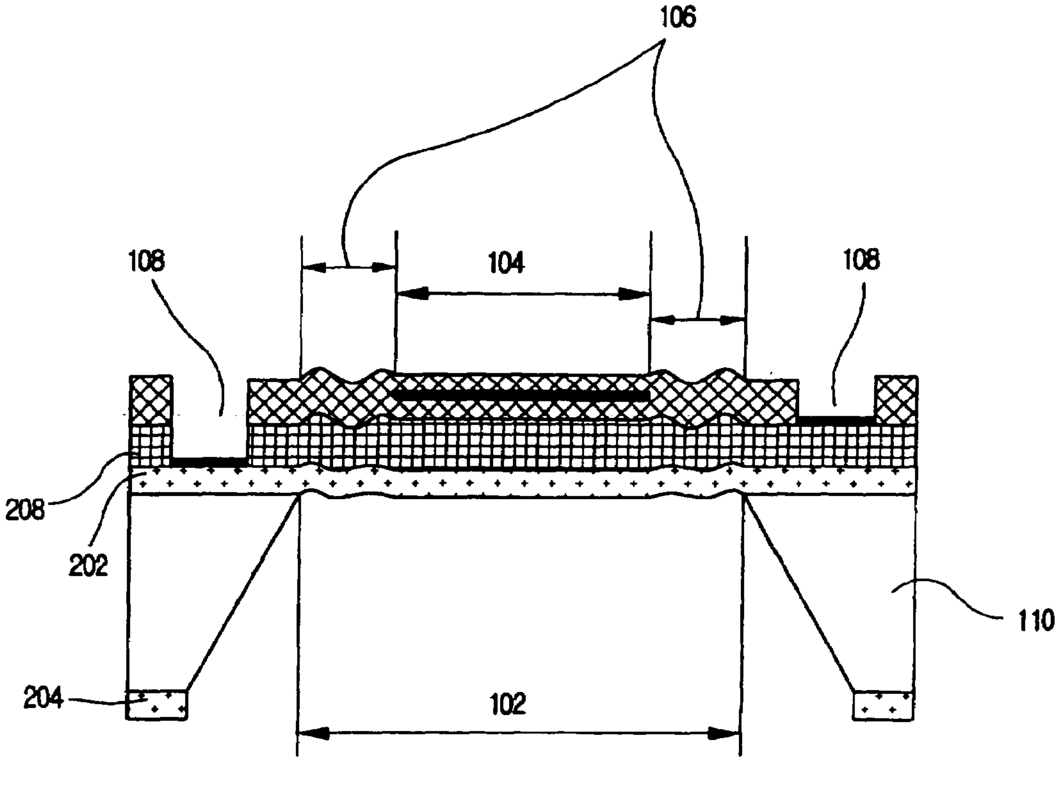
FIG. 1B shows a cross-sectional view of a schematic of piezoelectric microspeaker built on a wrinkled diaphragm.

As a novel idea for building micromachined acoustic transducers, we used a diaphragm that has a very high compressive residual stress, high enough to cause the diaphragm to be wrinkled as shown in FIG. 1A. By using a high compressive silicon nitride diaphragm, however, we maintain flatness in the speaker active area, through a mild tensile stress in the electrode layers, though the non-active area is wrinkled as described in FIG. 1B. This way, we can produce a large diaphragm deflection (without being hindered by the diaphragm stretching effect) with good control over a flat, active area where the electromechanical transduction is happening.

Fabrication and Testing Results

Figure 2:
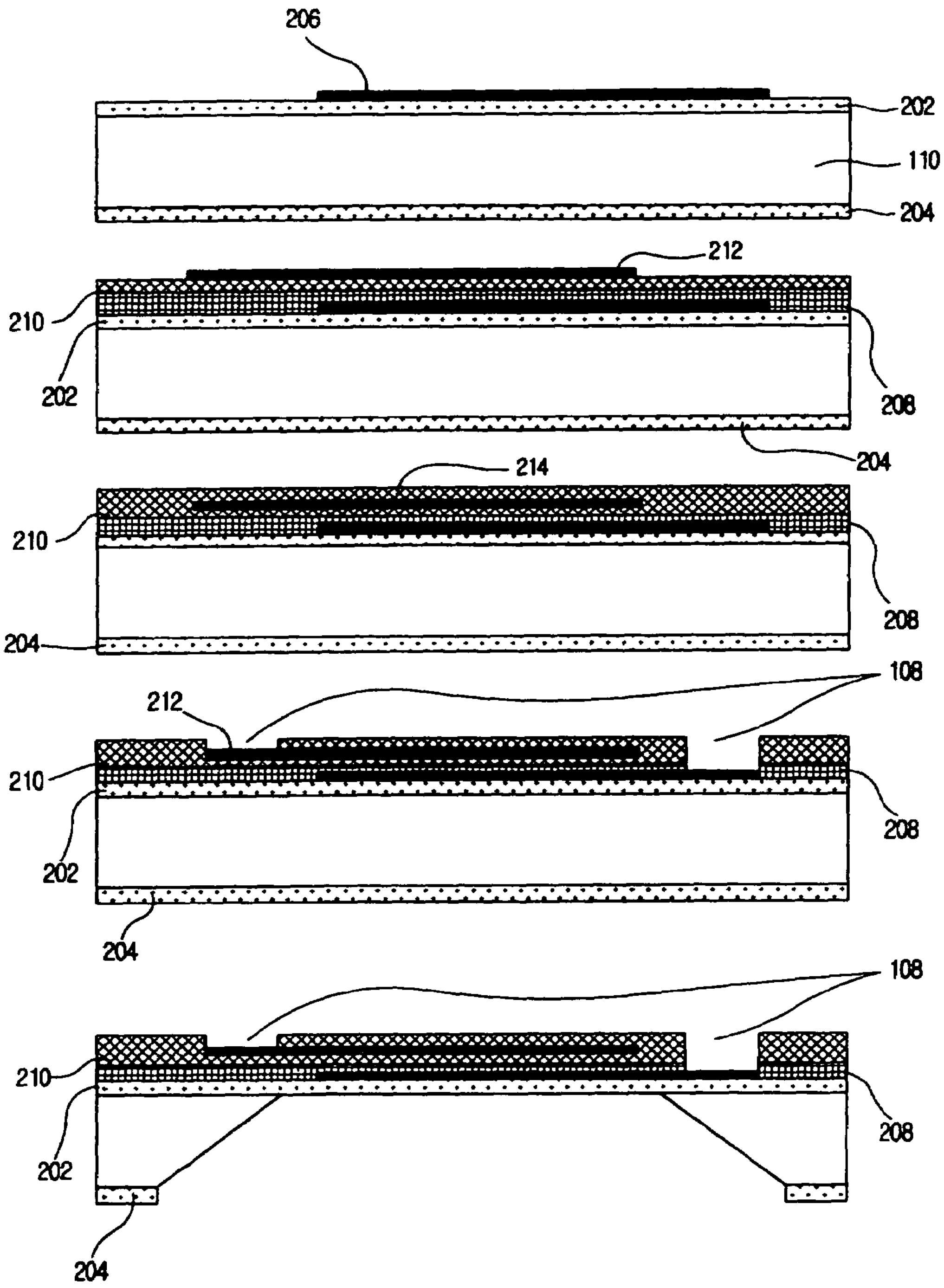
FIG. 2 shows fabrication process flows for the piezoelectric microspeaker.

Four masks are used in the fabrication process for the piezoelectric microspeaker shown in FIG. 2. First, 1 μm thick compressive silicon nitride film is deposited by Low Pressure Chemical Vapor Deposition (LPCVD) system on bare silicon wafers. An Al film is next deposited on the front side of the wafers for contact pads and electrodes. The film is approximately 0.5 μm thick, patterned by lithography to form bottom contact pads and electrodes, wet etched by using a potassium ferrocyanide (K3Fe(CN)6)/potassium hydroxide (KOH) solution. After depositing about 0.5 μm thick piezoelectric ZnO film by RF (Radio Frequency) magnetron sputtering system at 400 watts 275° C. substrate temperature, approximately 0.2 μm thin Parylene-D film is deposited with Parylene-deposition system only onto the front side of wafers at 8 mtorr for one and half hours (the weight of Parylene-D dimmer vaporizer is around 0.8 gram). In order to secure good contact, Parylene-D covered contact pads are patterned by lithography and dry etched by RIE (Reactive Ion Etching) system at 60 watts oxygen plasma ambient for 5 min. Then, 0.5 μm thick Al film is deposited to form top electrodes and contact pads, wet etched by using same etchant mentioned above. Since the Parylene-D has a low stiffness (one hundred times lower than silicon nitride film), the diaphragm was mechanically strengthened without critical changing of stiffness by depositing 1.0 μm thick Parylene-D (the weight of Parylene-D dimmer vaporizer is around approximately 4.0 gram.) onto front side only, which increases the yield by preventing breakage of diaphragms during cutting wafers into small chips. After Parylene-D patterning by lithography, which is dry etched by RIE system for 10 min at 100 watts oxygen plasma. Then, the ZnO film that is covered above bottom Al contact pads is wet etched by diluted phosphoric acid (H3PO4) solution (H3PO4:H2O=1:100). The back side silicon nitride is patterned by lithography, and dried etched by RIE system with CF4 plasma ambient at 100 watts for 30 min. And then, silicon substrate is removed by KOH solution under IR lamp [7] in order to release the diaphragm. After the silicon substrate is cleaned by flowing DI (De-Ionized) water and dried by nitrogen blowing, the wafer is cut into small chips in order to test its performance.

Figure 3:
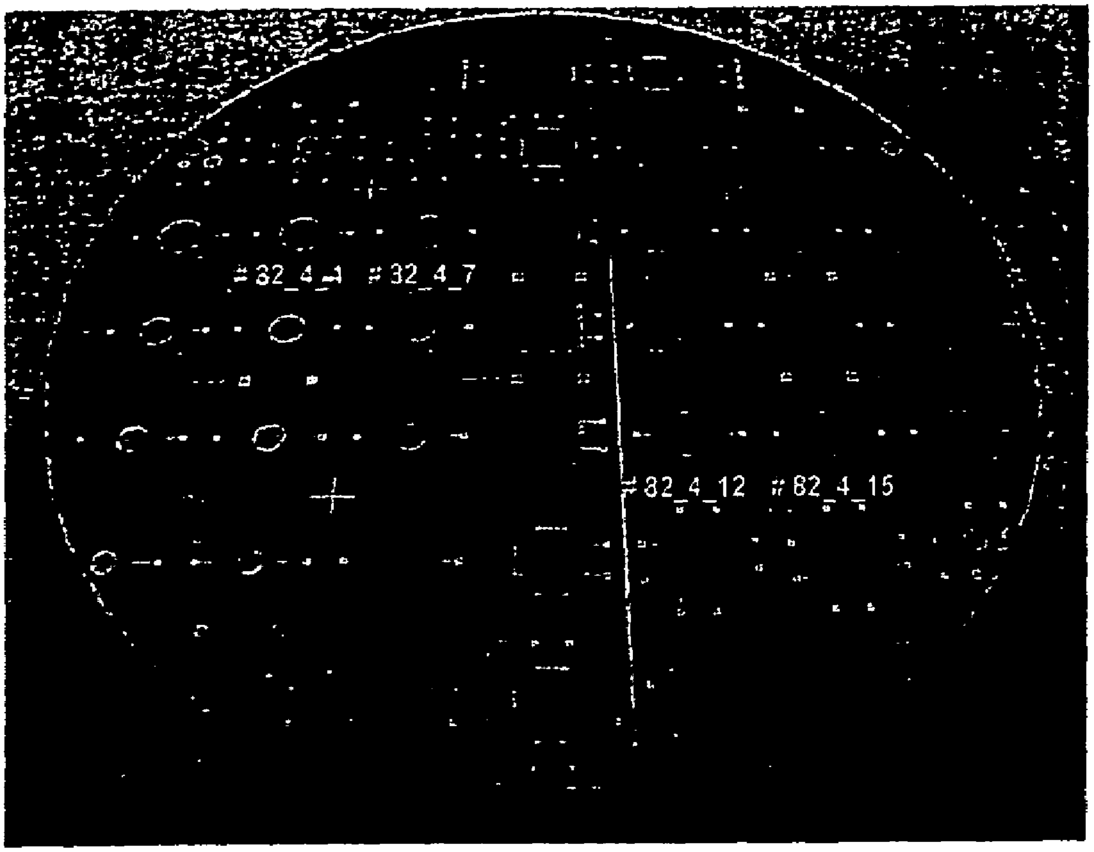
FIG. 3 shows photo taken from the front side of a completed 3" silicon wafer that contains various acoustic transducers.

FIG. 3 shows the photo of a fabricated 3" silicon wafer that contains the microspeakers (built on wrinkled diaphragms except the active regions sandwiched by Al electrodes). We have designed and fabricated various kinds of piezoelectric microspeakers (on a 5×5 mm2 diaphragm) with electrode shapes of circles (2 to 3 mm in diameter), grand cross (1.67 mm wide and with its four edges clamped to silicon), and rectangle (with its wide edge clamped to silicon). The labeling for the tested microspeakers is indicated in FIG. 3.

Figure 4:
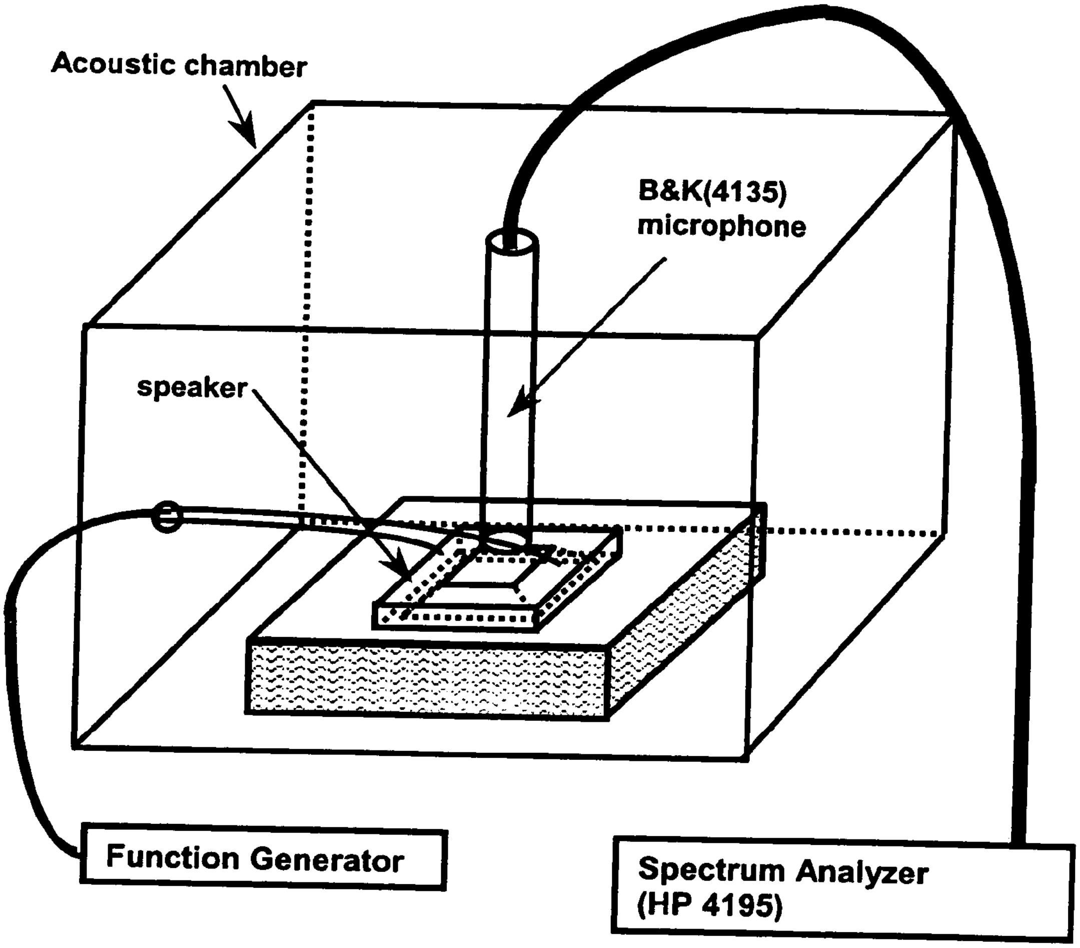
FIG. 4 shows a schematic diagram of the experimental set-up for the measurement of microspeaker frequency response.

FIG. 4 describes an experimental set-up for the fabricated microspeaker according to present invention. The fabricated microspeaker is put into an acoustic chamber shown in FIG. 4 and is actuated by applying sinusoidal wave (6 VPEAK-TO-PEAK) with function generator. The output frequency response has been measured without an acoustic coupler by reference microphone (B&K 4135 microphone) connected to the spectrum analyzer. The data has been normalized by the characteristic value of reference microphone.

Figure 5:
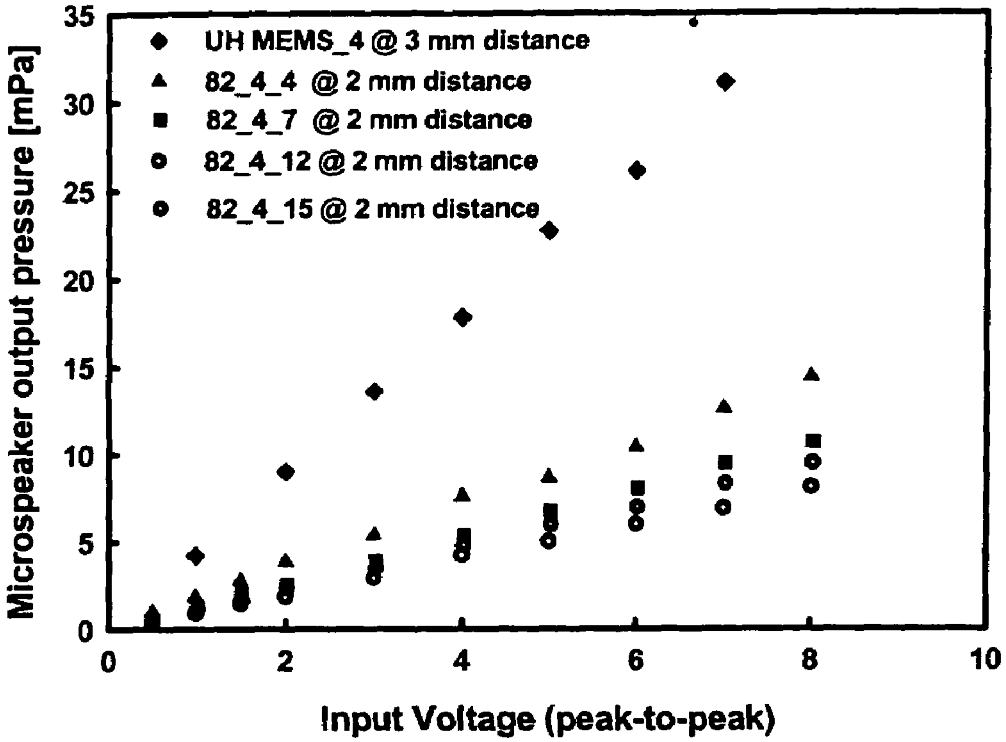
FIG. 5 shows a speaker output pressure versus input voltage measured at 1 kHz (without an acoustic coupler)
Figure 6:
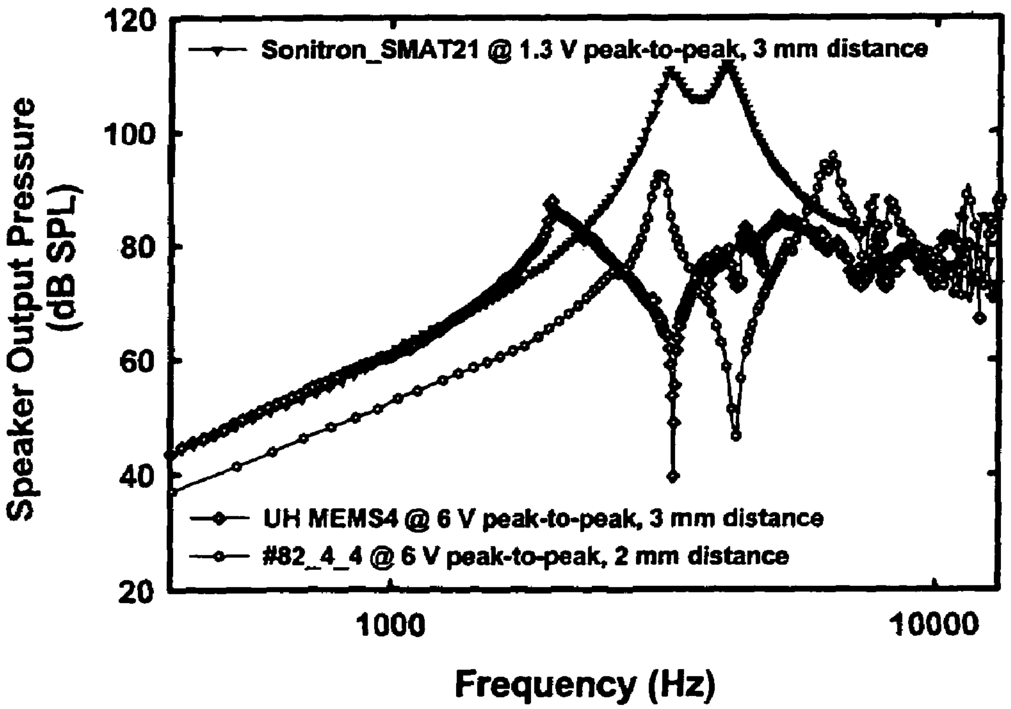
FIG. 6 shows a speaker output pressure versus frequency between 0.4 and 12 kHz (without an acoustic coupler).

FIG. 5 shows the microspeaker output pressure as a function of input voltages. As can be seen in FIG. 5 that shows the speaker sound output as a function of an input voltage at 1 kHz, the linearities of most of the fabricated microspeakers are very good over a wide range. The microspeaker labeled as UH MEMS4 (a grand cross type, which is shown in FIG. 1) produces about 26.1 mPa, while a circular type (# 82_4_4, which is shown in FIG. 3) produces 10.4 mPa at 6.0 Vpeak-to-peak. The frequency responses of the microspeakers have also been measured between 400 Hz and 12 kHz, and are shown in FIG. 6 along with that of a commercial piezoelectric speaker (SMAT_21). In the frequency range between 0.4 and 1.5 kHz, the microspeaker (UH MEMS4) produces comparable sound pressure as the commercial one. We, indeed, qualitatively observed several times higher sound output than what is quantitatively reported in FIG. 6.

Although the present invention has been described in considerable detail with reference to certain preferred versions thereof, other versions are possible. Therefore, The sprit and scope of the appended claims should not be limited to the description of the preferred versions contained herein.

What is claimed is:

1. A method for fabricating a micromachined piezoelectric microspeaker comprising the steps of:

forming a compressive film on a wafer;

forming a bottom electrode on a predetermined part of the compressive film of the front side of the wafer;

forming a piezoelectric film on the bottom electrode and on the compressive film of the front side of the wafer;

forming a bottom insulator film on the piezoelectric film;

forming a top electrode on a predetermined part of the bottom insulator where the top electrode is located over some part of the bottom electrode;

forming a top insulator film on the top electrode and on the bottom insulator film;

forming contact pads for the bottom electrode and top electrode at an outside part of each electrode; and removing a predetermined part of the wafer which is located between wafer parts located under the each contact pad.

2. A method according to claim 1, wherein the compressive film is compressive silicon nitride film.

3. A method according to claim 2, wherein the compressive silicon nitride film is deposited by LPCVD system.

4. A method according to claim 1, wherein the bottom electrode and top electrode are Al films.

5. A method according to claim 4, wherein the Al films are deposited and wet etched.

6. A method according to claim 1, wherein the piezoelectric film is piezoelectric ZnO film.

7. A method according to claim 6, wherein the piezoelectric ZnO film is deposited by RF magnetron sputtering.

8. A method according to claim 1, wherein all the insulator films are Parylene-D films.

9. A method according to claim 8, wherein the Parylene-D films are deposited with Parylene-deposition system.

10. A method according to claim 1, wherein the contact pads are formed by dry etching Parylene-D films with RIE system and wet etching the ZnO film with diluted phosphoric acid solution.

11. A method according to claim 1, the removed part of the wafer is removed after the backside compressive film is removed.

12. A method according to claim 11, the backside compressive film is removed by dry etching with RIE system, and the removed part of the wafer is removed by KOH solution.

* * * * *